United States Patent
Uejima et al.

(10) Patent No.: US 9,363,344 B2
(45) Date of Patent: Jun. 7, 2016

(54) HIGH FREQUENCY MODULE AND HIGH FREQUENCY COMPONENT

(71) Applicant: Murata Manufacturing Co., Ltd., Nagaokakyo-shi, Kyoto-fu (JP)

(72) Inventors: Takanori Uejima, Nagaokakyo (JP); Muneyoshi Yamamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 15 days.

(21) Appl. No.: 14/453,848

(22) Filed: Aug. 7, 2014

(65) Prior Publication Data
US 2014/0349720 A1 Nov. 27, 2014

Related U.S. Application Data

(63) Continuation of application No. PCT/JP2013/052987, filed on Feb. 8, 2013.

(30) Foreign Application Priority Data

Feb. 23, 2012 (JP) .................................. 2012-036907

(51) Int. Cl.
*H04B 1/18* (2006.01)
*H04M 1/02* (2006.01)
(Continued)

(52) U.S. Cl.
CPC ............. *H04M 1/0277* (2013.01); *H04B 1/006* (2013.01); *H04B 1/0458* (2013.01); *H04B 1/18* (2013.01); *H04B 1/48* (2013.01)

(58) Field of Classification Search
CPC ........ H04B 1/006; H04B 1/18; H04B 1/0458; H04B 1/48

USPC ............. 455/73, 550.1, 168.1, 280, 282, 303, 455/306, 307
See application file for complete search history.

(56) References Cited

U.S. PATENT DOCUMENTS 7,005,940 B2 * 2/2006 Kodim ...................... H01P 1/15
333/101
2005/0243000 A1 11/2005 Hwang et al.
(Continued)

FOREIGN PATENT DOCUMENTS

CN 1973401 A 5/2007
CN 102138285 A 7/2011
(Continued)

OTHER PUBLICATIONS

Official Communication issued in International Patent Application No. PCT/JP2013/052987, mailed on Apr. 23, 2013.

*Primary Examiner* — Tuan Pham
(74) *Attorney, Agent, or Firm* — Keating & Bennett, LLP

(57) ABSTRACT

A high frequency module is configured to be compatible with a cellular phone with a plurality of specifications without increasing the number of ports in a switching device. The high frequency module includes a switching device and a module board. The switching device includes a common port and connection switch ports. The module board includes external connection ports and a third filter circuit. An external connection port is connected to one of the connection switch ports of the switching device via a transmission line inside the module board. The third filter circuit is connected to a second external connection port and a third external connection port independently from the device connection ports of the switching device.

19 Claims, 7 Drawing Sheets

(51) Int. Cl.
  *H04B 1/00* (2006.01)
  *H04B 1/04* (2006.01)
  *H04B 1/48* (2006.01)

(56) References Cited

U.S. PATENT DOCUMENTS

| | | | |
|---|---|---|---|
| 2009/0174622 A1 | 7/2009 | Kanou | |
| 2009/0185512 A1 | 7/2009 | Hayakawa | |
| 2010/0304693 A1 | 12/2010 | Uejima et al. | |
| 2011/0181342 A1* | 7/2011 | Uejima | H04B 1/0057 327/416 |
| 2011/0300820 A1* | 12/2011 | Uejima | H04B 1/18 455/192.1 |
| 2013/0215808 A1* | 8/2013 | Muthukrishnan | H02H 9/045 370/297 |

FOREIGN PATENT DOCUMENTS

| | | |
|---|---|---|
| JP | 2003-152588 A | 5/2003 |
| JP | 2007-180871 A | 7/2007 |
| JP | 2011-97557 A | 5/2011 |
| JP | 2012-19307 A | 1/2012 |
| WO | 2008/013170 A1 | 1/2008 |
| WO | 20101024376 A1 | 3/2010 |

* cited by examiner

PL1

PL2

PL3

PL4  GND

PL5

PL6

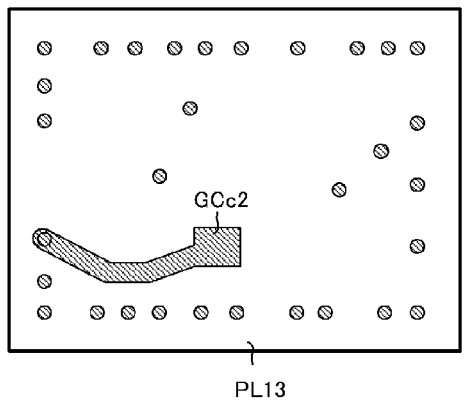
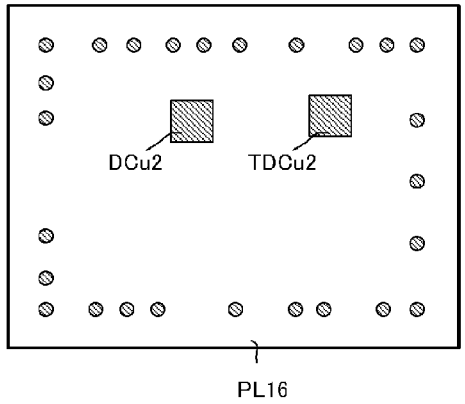
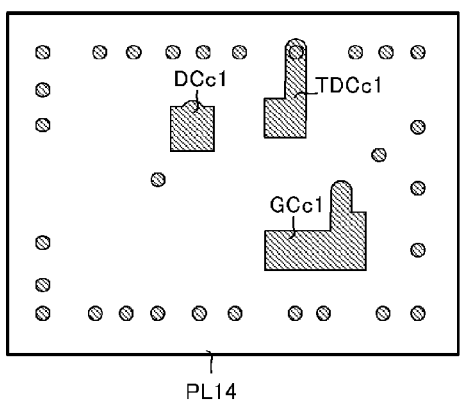
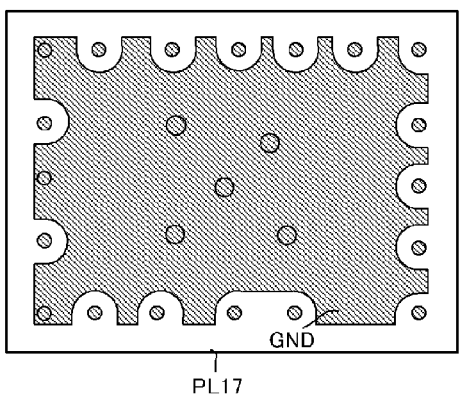
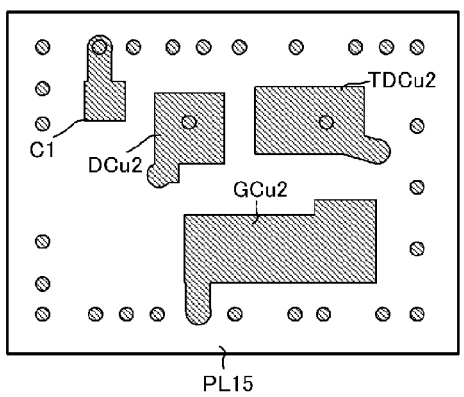
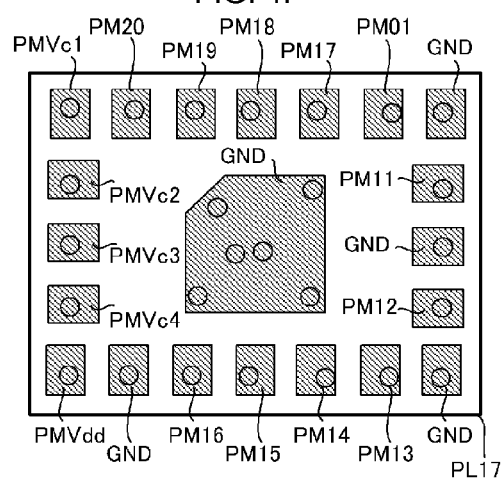

HIGH FREQUENCY MODULE AND HIGH FREQUENCY COMPONENT

BACKGROUND OF THE INVENTION

1. Field of the Invention

The present invention relates to high frequency modules through which high frequency signals complying with a plurality of communication systems or band classes pass and high frequency components constructed by mounting high frequency modules on module mount boards.

2. Description of the Related Art

In recent years, cellular phones with specifications complying with a plurality of communication systems or band classes (see Japanese Unexamined Patent Application Publication No. 2003-152588, for example) are becoming more common. Thus, high frequency modules installed in these cellular phones are configured to include a switching device and a plurality of filter circuits. The switching device is configured to include a plurality of connection switch ports that switch between connection destinations of antenna. The plurality of filter circuits is connected to the respective connection switch ports. Each filter circuit is configured to pick up a frequency that corresponds to one of the plurality of communication systems or band classes.

The specifications of communication systems or band classes or the like used in cellular phones generally differ depending on the area or provider of communication service. Further, a conventional high frequency module is configured to comply with one specification of cellular phone, and not comply with a plurality of specifications of cellular phone.

Thus, a supply side of high frequency modules such as module makers and the like is required to develop, design, and manufacture high frequency modules that comply with each cellular phone specification. This prevents development of a common high frequency module for use in a plurality of specifications of cellular phone, leading to unchanging higher supply costs and longer supply periods.

Further, a demand side of high frequency modules such as cellular phone makers and the like is required to keep track of high frequency modules for each specification of cellular phone. This complicates the management of components as the number of components to be managed increases.

In view of the above, it may be conceivable to make the high frequency module compatible with the cellular phone with a plurality of specifications by increasing the number of the connection switch ports in the switching device or the filter circuits to include additional compatible communication systems or band classes. However, in such cases, it also means that the number of the connection switch ports of a switching device is to be increased in response to the number of the communication systems or band classes to add. In other words, the switching device of the high frequency module will include unused ports. This leads to a higher cost for the switching device and makes it more difficult to justify a cost-cutting effect from using the common high frequency module.

SUMMARY OF THE INVENTION

Thus, preferred embodiments of the present invention provide a high frequency module configured so that the high frequency module is compatible with the cellular phone with a plurality of specifications without increasing the number of connection switch ports of the switching device or so that the number of components to be managed at the demand side is reduced.

A high frequency module according to a preferred embodiment of the present invention includes a switching device and a module board. The switching device includes a plurality of ports including a common port and connection switch ports. A plurality of the connection switch ports is configured to allow switching between connection destinations of the common port. The module board includes a plurality of external connection ports, a plurality of device connection ports, a first circuit portion, and a second circuit portion. The plurality of external connection ports is arranged on a first principle surface of the module board. The plurality of device connection ports are arranged on a second principle surface of the module board. On the plurality of device connection ports, certain ones of the plurality of ports of the switching device are mounted. Further, the plurality of device connection ports is connected to ones of the plurality of external connection ports via wiring inside the module board. The first circuit portion is connected to one of the plurality of external connection ports and one of the plurality of device connection ports. The second circuit portion is connected to two of the plurality of external connection ports independently from the plurality of device connection ports.

This high frequency module is configured to change signals flowing through the external connection ports in a case where wiring is arranged so as to connect the first circuit portion and the second circuit portion in a mount board or the like on which the high frequency module is mounted and a case where the first circuit portion is used as it is without forming wiring to connect the first circuit portion and the second circuit portion. Thus, signals in the state where the second circuit portion is not connected and signals in the state where the second circuit portion is connected may be made to correspond to different specifications of cellular phone. This allows the high frequency module to be compatible with a cellular phone with a plurality of specifications. Further, this allows the demand side to perform settings of wiring connection of the first circuit portion and the second circuit portion. A reduction in the number of components to be managed is achieved by allowing the high frequency module to correspond to different specifications of cellular phone.

Preferably, in the foregoing high frequency module, the number of the plurality of ports included in the switching device preferably is less than the number of the external connection ports included in the module board.

In the foregoing high frequency module, the external connection port connected to the first circuit portion and the external connection port connected to the second circuit portion preferably is arranged adjacent to each other on the first principle surface of the module board.

In the foregoing high frequency module, the first circuit portion preferably is a transmission line that is connected to the connection switch port of the switching device, and the second circuit portion preferably includes a filter circuit that picks up a signal at a preset frequency band. Further, preferably, a high frequency component on which this high frequency module is mounted includes a first mount board or a second mount board.

The first mount board preferably includes an antenna port, a filter circuit port, and a ground electrode. The antenna port is connected to the common port of the switching device via the external connection port of the module board. The filter circuit port is connected to the first circuit portion via the external connection port of the module board. The ground electrode sets potentials of two external connection ports connected to the second circuit portion to a ground potential.

The second mount board includes an antenna port, a filter circuit port, and a transmission line. The antenna port is connected to the common port of the switching device via the external connection port of the module board. The filter circuit port is connected to the second circuit portion via the external connection port of the module board. The transmission line is connected between the first circuit portion and the second circuit portion.

In the foregoing high frequency module, the first circuit portion preferably is a transmission line that is connected to the common port of the switching device, and the second circuit portion preferably includes an electro-static discharge protection circuit that allows an excess current to overflow to ground. Further, preferably, a high frequency component on which this high frequency module is mounted may include a third mount board or a fourth mount board.

The third mount board includes an antenna port, a filter circuit port, and a ground electrode. The filter circuit port is connected to the connection switch port of the switching device via the external connection port of the module board. The antenna port is connected to the first circuit portion via the external connection port of the module board. The ground electrode sets potentials of two external connection ports connected to the second circuit portion to a ground potential.

The fourth mount board preferably includes an antenna port, a filter circuit port, and a transmission line. The filter circuit port is connected to the connection switch port of the switching device via the external connection port of the module board. The antenna port is connected to the second circuit portion via the external connection port of the module board. The transmission line is connected between the first circuit portion and the second circuit portion.

According to various preferred embodiments of the present invention, use/no-use of the second circuit portion may be determined in response to a change in wiring at the demand side. This makes it possible to perform different functions at the port connected to the first circuit portion of the switching device in a case where the second circuit portion is used and a case where the second circuit portion is not used. Accordingly, single high frequency module is allowed to comply with a plurality of specifications of cellular phone without increasing the number of ports in the switching device, making it possible to cut the supply period and reduce the supply cost of high frequency modules by mass production. Further, the use of this high frequency module makes it possible to reduce the number of components to be managed at the demand side, thus making it possible to avoid complications in the component management.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A-4F include buildup diagrams of a high frequency circuit module according to the first preferred embodiment of the present invention.

DETAILED DESCRIPTION OF THE PREFERRED EMBODIMENTS

First Preferred Embodiment

Hereinafter, a high frequency component and a high frequency module according to the first preferred embodiment of the present invention are described.

The high frequency module according to the present preferred embodiment preferably is configured to comply with a first specification and a second specification of cellular phone. The first specification of cellular phone preferably corresponds to standards of Global System for Mobile Communications (GSM: Registered trademark) and standards of Time Division Synchronous Code Division Multiple Access (TDSCDMA). The second specification of cellular phone preferably corresponds to the standards of GSM (Registered trademark) and standards of Wideband Code Division Multiple Access (WCDMA).

Note that, in this example, the standards of GSM (Registered trademark) are common in the first specification and the second specification of cellular phone, but they differ in the WCDMA standards and the TDSCDMA standards. However, the common standards are not limited thereto and may be any communication system or any band class, or no common standard may be included. Further, the different standards to be included are not limited to the WCDMA standards and the TDSCDMA standards, and may be any communication systems or any band classes, or each specification may correspond to plural sets of standards that differ from another specification.

Further, in the following description, a case is described where a switch IC is preferably used as an example of a switching device. However, the present preferred embodiment may be similarly applied to a switching device having different structure.

Figure 1:
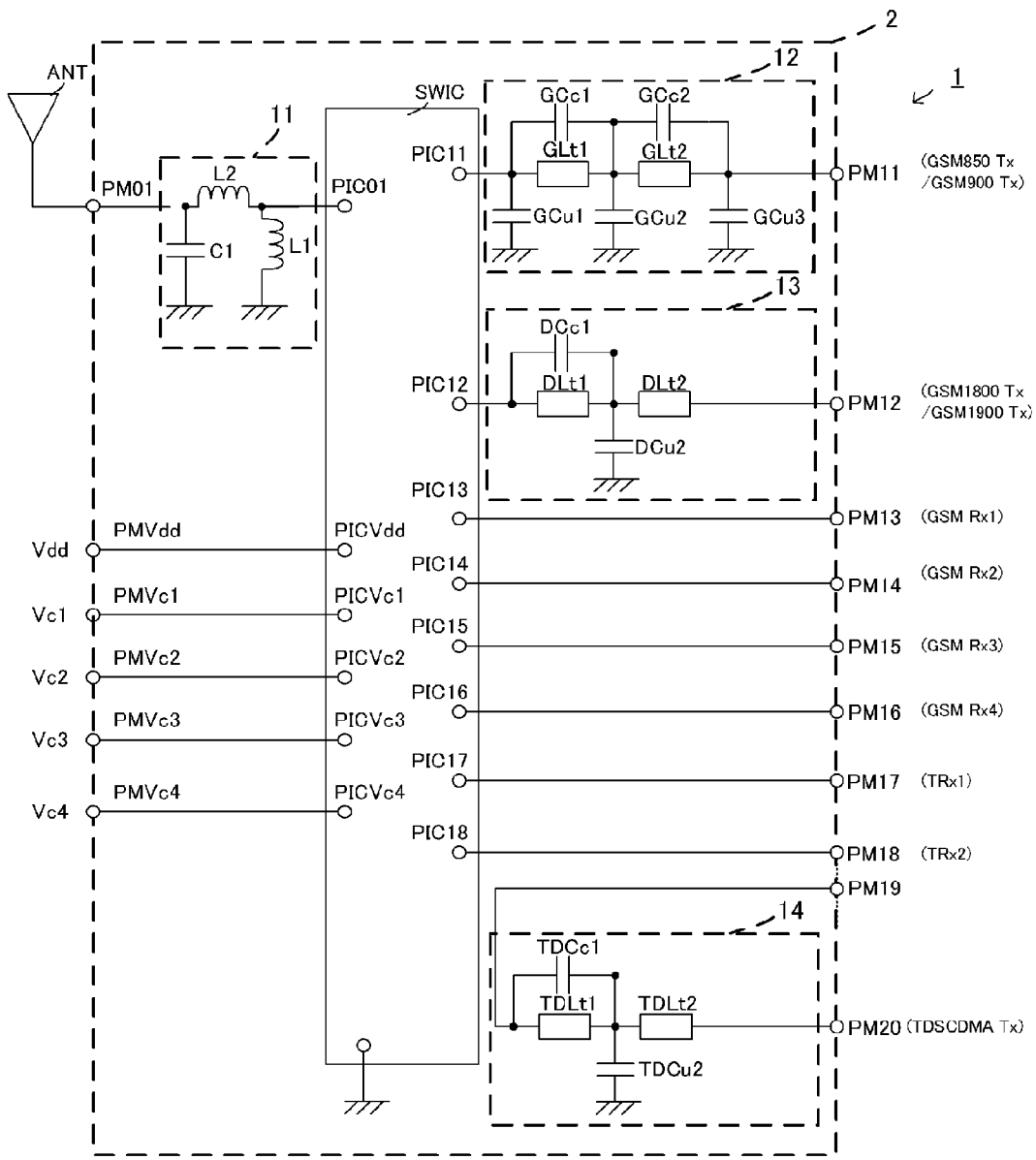
FIG. 1 is a diagram illustrating a configuration of a high frequency circuit module according to a first preferred embodiment of the present invention.

First, a circuit configuration of a high frequency module according to the first preferred embodiment is described. FIG. 1 is a block diagram illustrating a circuit configuration of a high frequency module 1.

The high frequency module 1 includes a module board 2 and a switching device SWIC.

The switching device SWIC includes a power port PICVdd, control ports PICVc1 to PICVc4, a common port PIC01, and connection switch ports PIC11 to PIC18, and is mounted on the module board 2. The switching device SWIC is activated by applying a drive voltage (Vdd) to the power port PICVdd. By applying control voltages (Vc1, Vc2, Vc3, and Vc4) on the control ports PICVc1, PICVc2, PICVc3, and PICVc4 during operation, the switching device SWIC is put into a state where the common port PIC01 is connected to one of the connection switch ports PIC11 to PIC18 in response to a combination of the control voltages (Vc1, Vc2, Vc3, and Vc4).

The module board 2 preferably defined by a low-temperature sintered ceramic multilayer board (LTCC) and configured so that one of its two principle surfaces defines a board mounting plane to be mounted on an external mount board and the other principle surface defines a device mount plane on which the switching device SWIC is mounted.

The module board 2 includes, inside the board, an antenna matching circuit 11, a first filter circuit 12, a second filter circuit 13, a third filter circuit 14, and a plurality of wiring electrodes. Further, on the board mounting plane, the module board 2 includes external connection ports PMVdd, PMVc1 to PMVc4, PM01, and PM11 to PM20. Further, on the device mount plane, the module board 2 includes a plurality of device connection ports (not illustrated) to be connected to respective ports of the switching device SWIC.

The external connection port PMVdd is a port to which the drive voltage (Vdd) is applied and is connected to the power port PICVdd of the switching device SWIC via the wiring electrode inside the board.

The external connection ports PMVc1 to PMVc4 are ports to which the control voltages (Vc1, Vc2, Vc3, and Vc4) are applied, respectively, and are connected to the control ports PICVc1 to PICVc4 of the switching device SWIC via the wiring electrodes inside the board.

The external connection port PM01 is a port to be connected to the antenna port ANT and is connected to the common port PIC01 of the switching device SWIC via the antenna matching circuit 11 inside the board. The antenna matching circuit 11 includes inductances L1 and L2 and a capacitance C1, and is a circuit configured to perform impedance matching between the antenna port ANT and the common port PIC01 of the switching device SWIC. Note that the antenna matching circuit 11 also defines and functions as an electro-static discharge (ESD) protection circuit and allows an excess current caused by static electricity to overflow to ground.

The external connection port PM11 is a port to be connected to a transmission signal processing circuit of GSM850 and GSM900, and is connected to the connection switch port PIC11 of the switching device SWIC via the first filter circuit 12 inside the board. The first filter circuit 12 includes inductances GLt1 and GLt2 and capacitances GCc1, GCc2, GCu1, GCu2, and GCu3. The first filter circuit 12 is a filter circuit in which pass bands correspond to usage frequency bands of transmission signals in GSM850 and transmission signals in GSM900, and attenuates second harmonics and third harmonics of the GSM850 transmission signals and the GSM900 transmission signals.

The external connection port PM12 is a port to be connected to a transmission signal processing circuit of GSM1800 and GSM1900, and is connected to the connection switch port PIC12 of the switching device SWIC via the second filter circuit 13 inside the board. The second filter circuit 13 includes inductances DLt1 and DLt2 and capacitances DCc1 and DCu2. The second filter circuit 13 is a filter circuit in which pass bands correspond to usage frequency bands of transmission signals in GSM1800 and transmission signals in GSM1900, and attenuates second harmonics and third harmonics of the GSM1800 transmission signals and the GSM1900 transmission signals.

The external connection port PM13 is a port to be connected to a reception signal processing circuit for one of GSM850, GSM900, GSM1800, and GSM1900, and is connected to the connection switch port PIC13 of the switching device SWIC via a transmission line inside the board.

The external connection port PM14 is a port to be connected to a reception signal processing circuit for one of GSM850, GSM900, GSM1800, and GSM1900, and is connected to the connection switch port PIC14 of the switching device SWIC via a transmission line inside the board.

The external connection port PM15 is a port to be connected to a reception signal processing circuit for one of GSM850, GSM900, GSM1800, and GSM1900, and is connected to the connection switch port PIC15 of the switching device SWIC via a transmission line inside the board.

The external connection port PM16 is a port to be connected to a reception signal processing circuit for one of GSM850, GSM900, GSM1800, and GSM1900, and is connected to the connection switch port PIC16 of the switching device SWIC via a transmission line inside the board.

The external connection port PM17 is a port to be connected to the ground or a transmission-reception signal processing circuit for a first band class of WCDMA, and is connected to the connection switch port PIC17 of the switching device SWIC via a transmission line inside the board.

The external connection port PM18 is a port to be connected to a transmission-reception signal processing circuit for a second band class of WCDMA or to be connected to the external connection port PM19 via wiring provided on the external mount board, and is connected to the connection switch port PIC18 of the switching device SWIC via a transmission line inside the board. Note that the transmission line located between this external connection port PM18 and the connection switch port PIC18 corresponds to a first circuit portion of the present preferred embodiment. Other than the transmission line, in some cases, it may be preferable to use another form of LC circuit or matching circuit or the like as the first circuit portion.

The external connection port PM19 is a port to be connected to a ground potential or the external connection port PM18 via wiring provided on the external mount board, and is connected to the external connection port PM20 via the third filter circuit 14 inside the board. The external connection port PM20 is a port to be connected to the ground potential or a transmission-reception signal processing circuit of TDSCDMA, and is connected to the external connection port PM19 via the third filter circuit 14 inside the board. The third filter circuit 14 is a low-pass filter including inductances TDLt1 and TDLt2 and capacitances TDCc1 and TDCu2, and attenuates second harmonics and third harmonics of transmission signals of TDSCDMA. Note that the third filter circuit 14 provided between this external connection port PM19 and the external connection port PM20 corresponds to a second circuit portion of the present preferred embodiment. Other than the low-pass filter, in some cases, it may be preferable to use a different filter circuit or matching circuit or the like, which corresponds to a target communication system or band class, as the second circuit portion.

Connection modes of those external connection ports PM17, PM18, PM19, and PM20 are determined in response to a wiring structure on the external mount board on which the high frequency module 1 is mounted.

Specifically, when the high frequency module 1 is mounted on the external mount board of a cellular phone with the first specification that complies with the WCDMA standards, the external connection port PM17 is directly connected to the transmission-reception signal processing circuit of the first band class of WCDMA. The external connection port PM18 is directly connected to the transmission-reception signal processing circuit of the second band class of WCDMA. Further, the external connection port PM19 and the external connection port PM20 are connected to the ground potential.

Providing such a wiring structure in an external mount circuit allows the high frequency module 1 to comply with the first specification or with the GSM (Registered trademark) standards and the WCDMA standards.

Further, when the high frequency module 1 is mounted on the external mount board of a cellular phone with the second specification that complies with the TDSCDMA standards, the external connection port PM17 is connected to the ground in the external mount board of the second specification. Further, the external connection port PM18 and the external connection port PM19 are connected to each other via wiring provided on the external mount board. The external connection port PM20 is connected to the transmission-reception signal processing circuit of TDSCDMA.

Providing such a wiring structure in the external mount circuit allows the high frequency module 1 to comply with the second specification or with the GSM (Registered trademark) standards and the TDSCDMA standards.

Next, a specific structure of the high frequency module 1 including the foregoing circuit configuration is described. FIG. 2 to FIG. 4 are buildup diagrams of the module board 2 illustrating the specific structure of the high frequency module 1. The module board 2 described below is provided preferably by stacking 17 dielectric layers on top of each other. On each dielectric layer, preset electrode patterns that define the high frequency module 1 and via-electrodes connecting between the layers are provided. The via-electrodes are designated with circles in each layer of FIG. 2 to FIG. 4. Note that, in the following description, a topmost dielectric layer is referred to as a dielectric layer PL1. The larger number is assigned to the lower layer. A bottommost dielectric layer is referred to as a dielectric layer PL17.

Figure 2A:
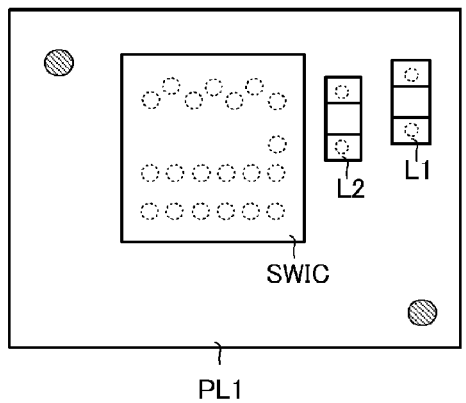
FIGS. 2A-2F include buildup diagrams of a high frequency circuit module according to the first preferred embodiment of the present invention.

FIG. 2A is a mounted state diagram of the dielectric layer PL1 viewed from a top plane side. On the dielectric layer PL1, a switching device SWIC and inductor devices (L1, L2) are mounted. Further, on the top plane of the dielectric layer PL1, a plurality of device connection electrodes (not illustrated) is provided. Each device connection electrode is connected to each port of the switching device SWIC and the inductor devices (L1, L2). Further, a plurality of via-electrodes (dashed line circles) is provided in the layer of the dielectric layer PL1. Each via-electrode is connected to each device connecting electrode.

Figure 2B:
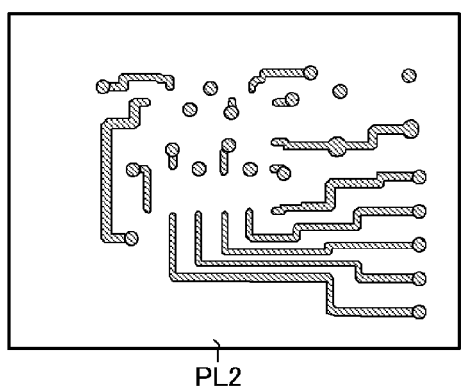
Figure 2C:
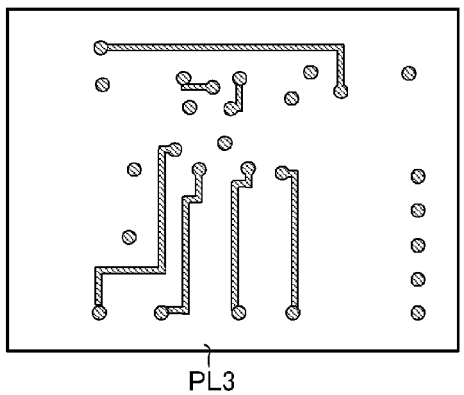

FIG. 2B is a diagram of the dielectric layer PL2 viewed from a top side. FIG. 2C is a diagram of the dielectric layer PL3 viewed from the top side. On the top planes of the dielectric layers PL2 and PL3, a plurality of routing electrodes is provided. The routing electrodes on the respective layers are connected to each other through the via-electrodes provided in the dielectric layer PL1, the dielectric layer PL2, and the dielectric layer PL3.

Figure 2D:
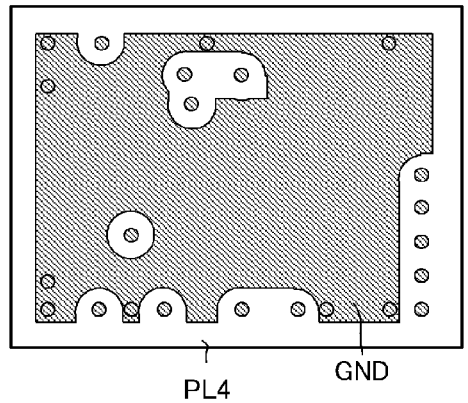
Figure 2E:
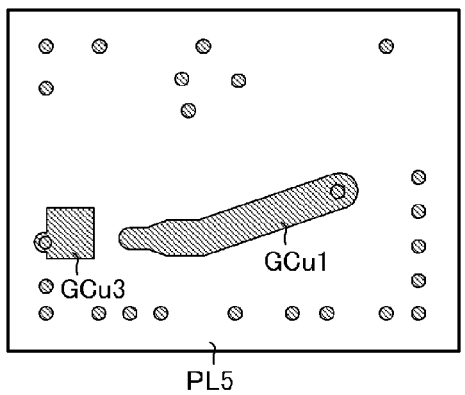

FIG. 2D is a diagram of the dielectric layer PL4 viewed from the top side. FIG. 2E is a diagram of the dielectric layer PL5 viewed from the top side. On the top plane of the dielectric layer PL4, an electrode pattern that defines the ground GND is provided. On the top plane of the dielectric layer PL5, an electrode pattern that defines the capacitor GCu1 and an electrode pattern that defines the capacitor GCu3 are provided. The respective electrode patterns provided on the dielectric layer PL5 form the capacitor GCu1 and the capacitor GCu3 while facing the dielectric layer of the dielectric layer PL4 and the ground GND.

Figure 2F:
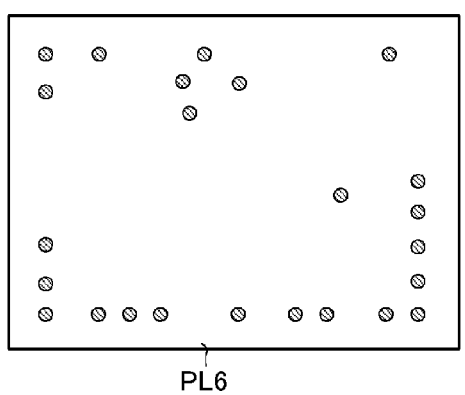

FIG. 2F is a diagram of the dielectric layer PL6 viewed from the top side. A plurality of via-electrodes is provided in the layer of the dielectric layer PL6.

Figure 3A:
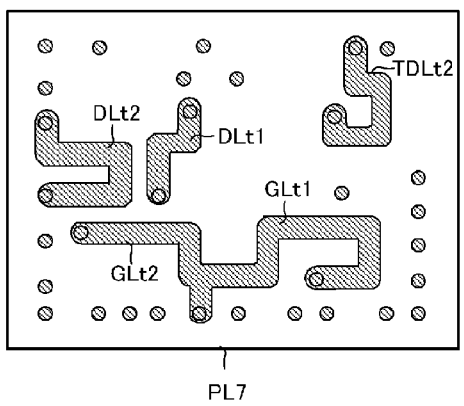
FIG. 3A-3F include buildup diagrams of a high frequency circuit module according to the first preferred embodiment of the present invention.
Figure 3D:
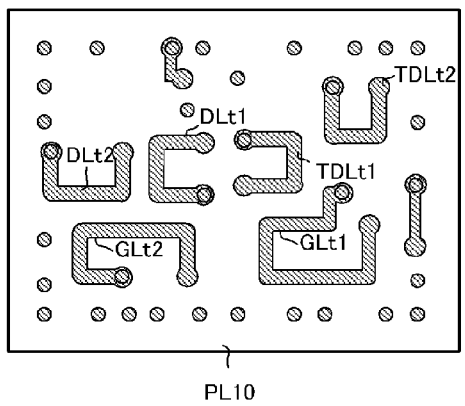
Figure 3B:
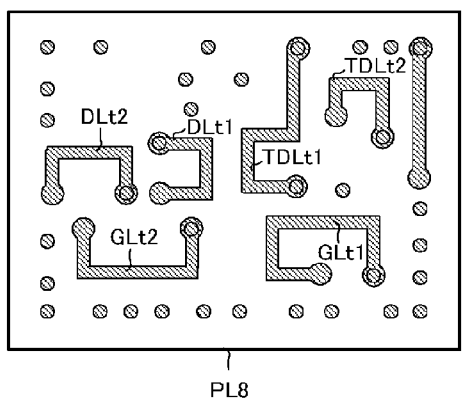
Figure 3E:
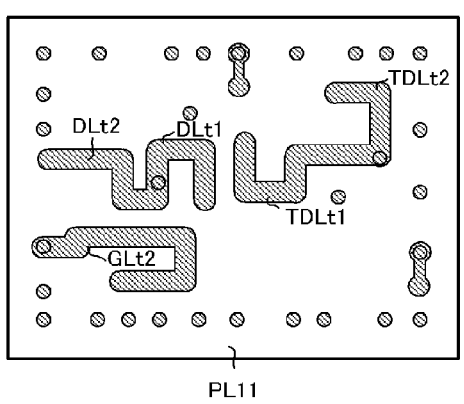
Figure 3C:
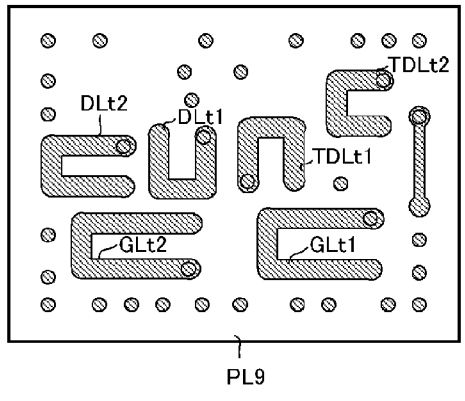

FIG. 3A is a diagram of the dielectric layer PL7 viewed from the top side. FIG. 3B is a diagram of the dielectric layer PL8 viewed from the top side. FIG. 3C is a diagram of the dielectric layer PL9 viewed from the top side. FIG. 3D is a diagram of the dielectric layer PL10 viewed from the top side. FIG. 3E is a diagram of the dielectric layer PL11 viewed from the top side. In the dielectric layer PL7 to the dielectric layer PL11, the electrode patterns that constitute the inductance GLt1, the inductance GLt2, the inductance DLt1, the inductance DLt2, the inductance TDLt1, and the inductance TDLt2 are provided on the respective top planes. The electrode patterns on the respective layers are connected to each other through the via-electrodes provided in the respective layers of the dielectric layer PL7 to the dielectric layer PL11.

Figure 3F:
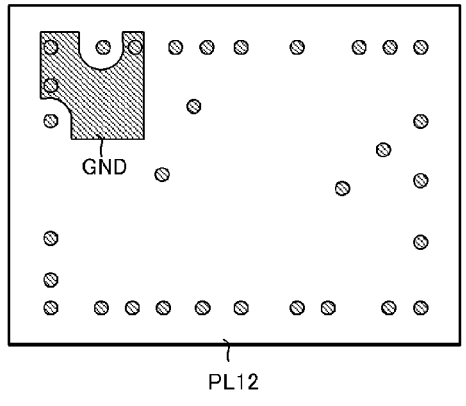

FIG. 3F is a diagram of the dielectric layer PL12 viewed from the top side. FIG. 4A is a diagram of the dielectric layer PL13 viewed from the top side. FIG. 4B is a diagram of the dielectric layer PL14 viewed from the top side. FIG. 4C is a diagram of the dielectric layer PL15 viewed from the top side. FIG. 4D is a diagram of the dielectric layer PL16 viewed from the top side. FIG. 4E is a diagram of the dielectric layer PL17 viewed from the top side. On the top planes of the dielectric layer PL12 and the dielectric layer PL17, electrode patterns that define the ground GND are provided. In the dielectric layer PL13 to the dielectric layer PL16, electrode patterns that constitute the capacitance GCc1, the capacitance GCc2, the capacitance GCu2, the capacitance DCc1, the capacitance DCu2, the capacitance TDCc1, the capacitance TDCu2, and the capacitance C1 are provided on the respective top planes. The electrode patterns of the respective layers define the capacitance GCc1, the capacitance GCc2, the capacitance GCu2, the capacitance DCc1, the capacitance DCu2, the capacitance TDCc1, the capacitance TDCu2, and the capacitance C1 by arranging the electrode patterns so as to face each other across the dielectric layer or to face the ground GND of the dielectric layer PL12 or of the dielectric layer PL17 across the dielectric layer.

FIG. 4F is a diagram of the dielectric layer PL17 viewed from a bottom side. On the bottom plane of the dielectric layer PL17, electrode patterns that become the external connection ports for module mounting are provided and arrayed. Here, as illustrated in the upper side of figure, the ground GND, the external connection port PM01, the external connection port PM17, the external connection port PM18, the external connection port PM19, the external connection port PM20, and the external connection port PMVc1 are arrayed in sequence to the left side of figure. Of these ports, modes of connections for the external connection port PM17, the external connection port PM18, the external connection port PM19, and the external connection port PM20 are determined in response to the wiring structure of external mount board. Thus, arranging these external connection ports PM17, PM18, PM19, and PM20 next to each other makes it easy to connect the external connection ports PM19 and PM20 to the ground potential at the external mount board or to configure the wiring structure so as to connect the external connection ports PM18 and PM19.

Figure 5A:
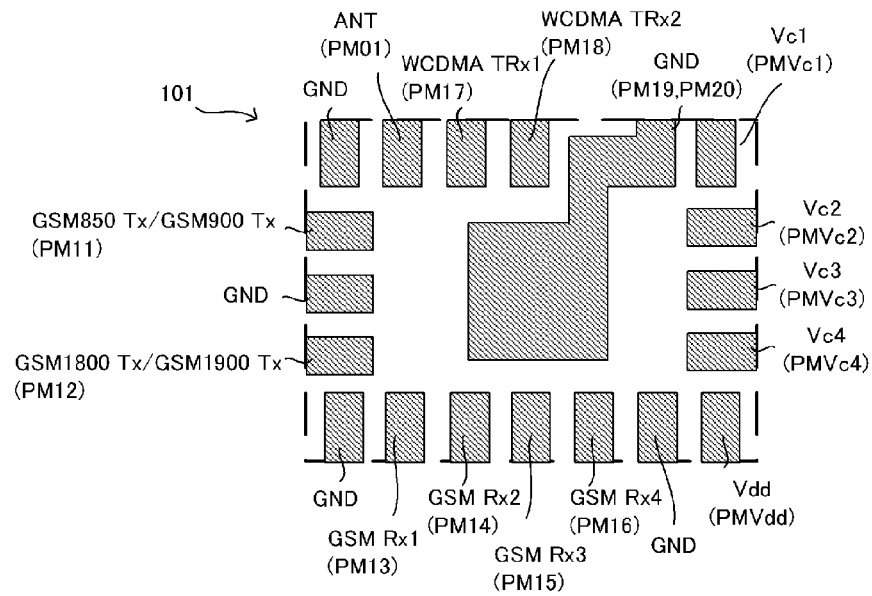
FIGS. 5A and 5B include wiring diagrams of mount board on which a high frequency circuit module according to the first preferred embodiment of the present invention is mounted.

FIG. 5A is a diagram illustrating an exemplary pattern of mount electrodes in an external mount board 101 for use in a high frequency component on which the high frequency module 1 is mounted. The external mount board 101 illustrated here corresponds to the first specification of cellular phone, namely, the GSM (Registered trademark) standards and the WCDMA standards. Note that this external mount board corresponds to a first mount board in the present preferred embodiment.

In this external mount board 101, as illustrated in the upper side of figure, a mount electrode to be connected to the ground GND, a mount electrode to be connected to the antenna port ANT, a mount electrode to be connected to the transmission-reception signal processing circuit of the first band class of WCDMA, a mount electrode to be connected to the transmission-reception signal processing circuit of the second band class of WCDMA, a mount electrode to be connected to the ground GND, and a mount electrode to be connected to the control voltage Vc1 are arrayed in sequence to the right side of figure. Thus, when the mounting plane of the high frequency module 1 illustrated in the foregoing FIG. 4F is mounted, the external connection port PM17 is connected to the transmission-reception signal processing circuit of the first band class of WCDMA via the mount electrode. The external connection port PM18 is connected to the transmission-reception signal processing circuit of the second band class of WCDMA via the mount electrode. The external connection port PM19 and the external connection port PM20 are connected to the ground GND via the mount electrodes.

In this configuration, the external connection ports PM17 and PM18 are directly connected to the transmission-reception signal processing circuits of WCDMA, and the external connection ports PM19 and PM20 are connected to the ground GND. This makes it possible to comply with the first specification of cellular phone. Further, the external connection ports PM19 and PM20 are connected to the ground GND. This makes it possible to prevent noise from entering through the external connection ports PM19 and PM20 or prevent isolation deterioration.

Figure 5B:
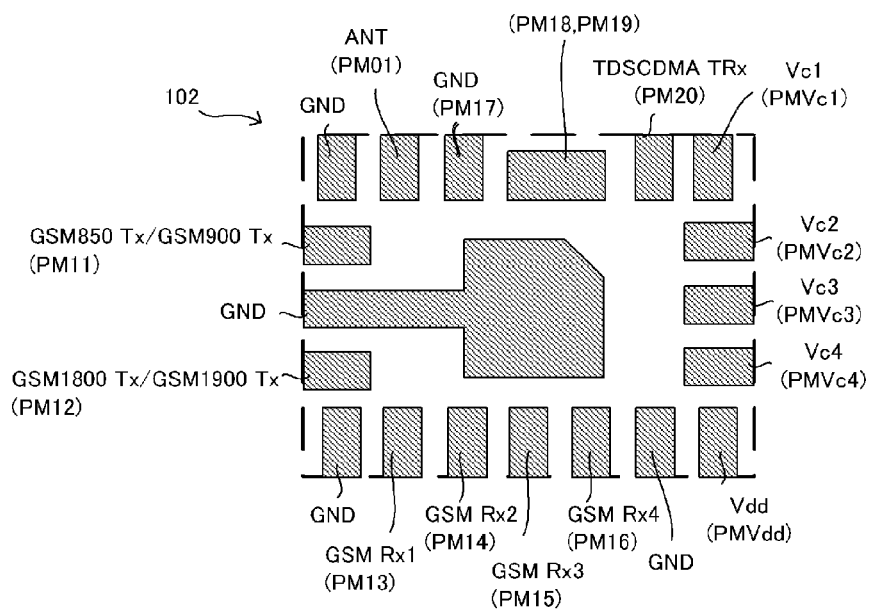

FIG. 5B is a diagram illustrating an exemplary pattern of mount electrodes in an external mount board 102 for use in a high frequency component on which the high frequency module 1 is mounted. The external mount board 102 illustrated here corresponds to the second specification of cellular phone, namely, the GSM (Registered trademark) standards and the TDSCDMA standards. Note that this external mount board corresponds to a second mount board in the present preferred embodiment.

In this external mount board 102, as illustrated in the upper side of figure, a mount electrode to be connected to the ground GND, a mount electrode to be connected to the antenna port ANT, a mount electrode to be connected to the ground GND, a mount electrode to connect the external connection port PM18 and the external connection port PM19, a mount electrode to be connected to the transmission-reception signal processing circuit of TDSCDMA, and a mount electrode to be connected to the control voltage Vc1 are arrayed in sequence to the right side of figure. Thus, when the mounting plane of the high frequency module 1 illustrated in the foregoing FIG. 4F is mounted, the external connection port PM17 is connected to the ground GND via the mount electrode. The external connection port PM18 and the external connection port PM19 are connected to each other via the mount electrode. The external connection port PM20 is connected to the transmission-reception signal processing circuit of TDSCDMA via the mount electrode.

In this configuration, the external connection port PM18 is connected to the transmission-reception signal processing circuits of TDSCDMA via the external connection port PM19, the third filter circuit 14 inside the board, and the external connection port PM20. This makes it possible to comply with the second specification of cellular phone.

As described in the above, even in a case where the number of the ports in the switching device SWIC to be mounted on the high frequency module 1 is less than the number of the external connection ports in the module board 2, the high frequency module 1 preferably is made to comply with a plurality of specifications of cellular phone. This makes it possible to eliminate the need to develop, design, and manufacture the high frequency module 1 for each cellular phone specification, and to reduce the supply cost and shorten the supply period. Further, in the demand side of high frequency modules such as cellular phone manufacturers and the like that receive supply of the high frequency modules 1 and mount them on the external mount boards 101 or the external mount boards 102, this makes it possible to reduce the number of components to be managed and simplifies the component management.

Second Preferred Embodiment

Next, a high frequency module according to a second preferred embodiment of the present invention is described.

The high frequency module according to the present preferred embodiment is capable of complying with a third specification and a fourth specification of cellular phone. The third specification of cellular phone corresponds to the GSM (Registered trademark) standards, standards of the first band class of WCDMA, and standards of the second band class of WCDMA. The fourth specification of cellular phone corresponds to the GSM (Registered trademark) standards, the standards of the first band class of WCDMA, and standards of the third band class of WCDMA.

Note that, in this example, the GSM (Registered trademark) standards are common in the third specification and the fourth specification of cellular phone, but they differ in the standards of the second band class of WCDMA and the standards of the third band class of WCDMA. However, the common standards are not limited thereto and may be any communication system or any band class, or no common standard may be included. Further, the different standards to be included are not limited to the standards of different band classes of WCDMA, and may be any communication systems or any band classes, or each specification may correspond to plural sets of standards that differ from another specification.

Further, in the following description, a case is described where a switch IC is used as an example of a switching device. However, the present preferred embodiment may be similarly applied to a switching device having a different structure.

Figure 6:
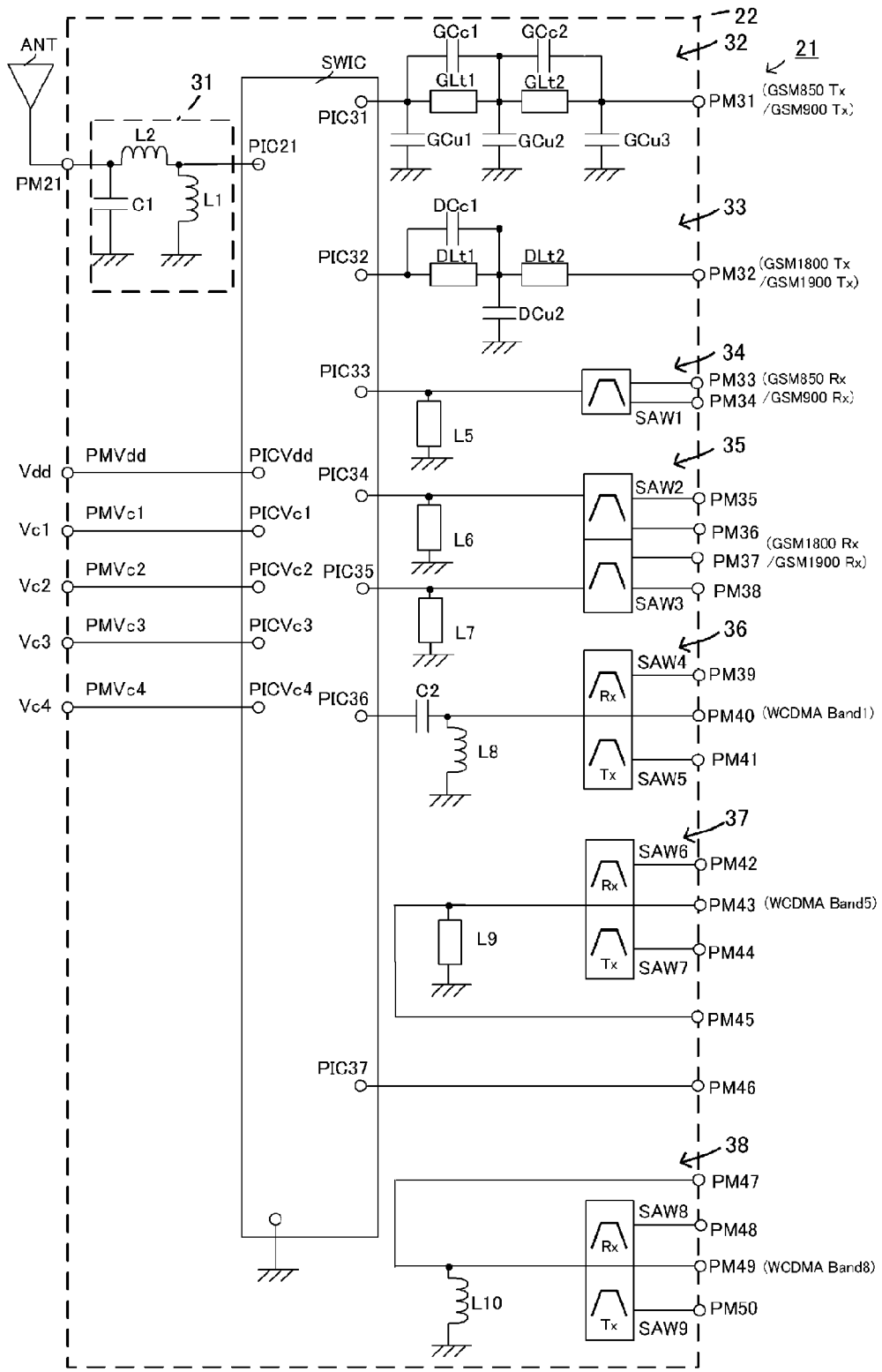
FIG. 6 is a diagram illustrating a configuration of a high frequency circuit module according to a second preferred embodiment of the present invention.

Now, a circuit configuration of a high frequency module 21 according to the second preferred embodiment is described. FIG. 6 is a block diagram illustrating the circuit configuration of the high frequency module 21. Note that detailed descriptions regarding constituting elements similar to those in the first preferred embodiment are omitted below.

The high frequency module 21 includes a module board 22 and a switching element SWIC.

The switching element SWIC includes a power port PICVdd, control ports PICVc1 to PICVc4, a common port PIC21, and connection switch ports PIC31 to PIC37.

The module board 22 includes, inside the board, an antenna matching circuit 31, a first filter circuit 32, a second filter circuit 33, a third filter circuit 34, a fourth filter circuit 35, a fifth filter circuit 36, a sixth filter circuit 37, a seventh filter circuit 38, and a plurality of wiring electrodes. Further, on a board mounting plane, the module board 22 includes external connection ports PMVdd, PMVc1 to PMVc4, PM21, and PM31 to PM50.

The external connection port PM21 is connected to the common port PIC21 of the switching device SWIC via the antenna matching circuit 31 inside the board.

The external connection port PM31 is connected to the connection switch port PIC31 of the switching device SWIC via the first filter circuit 32 inside the board.

The external connection port PM32 is connected to the connection switch port PIC32 of the switching device SWIC via the second filter circuit 33 inside the board.

The external connection port PM33 and the external connection port PM34 are balanced ports to be connected to a reception signal processing circuit of GSM850 or GSM900, and are connected to the connection switch port PIC33 of the switching device SWIC via the third filter circuit 34 inside the board. The third filter circuit 34 is configured with a matching inductance L5 and a surface acoustic wave filter SAW1.

The external connection ports PM35 to PM38 are two pairs of balanced ports to be connected to a reception signal processing circuit of GSM1800 or GSM1900, and are connected to the connection switch port PIC34 and the connection switch port PIC35 of the switching device SWIC via the fourth filter circuit 35 inside the board. The fourth filter circuit 35 is configured with matching inductances L6 and L7 and two surface acoustic wave filters SAW2 and SAW3.

The external connection ports PM39 to PM41 are unbalanced/balanced ports to be connected to a transmission-reception signal processing circuit of Band 1 class of WCDMA, and are connected to the connection switch port PIC36 of the switching device SWIC via the fifth filter circuit 36 inside the board. The fifth filter circuit 36 is configured with a capacitance C2 and an inductance L8 to perform matching and two surface acoustic wave filters SAW4 and SAW5.

The external connection ports PM42 to PM44 are unbalanced/balanced ports to be connected to the ground potential or a transmission-reception signal processing circuit of Band 5 class of WCDMA, and are connected to the external connection port PM45 via the sixth filter circuit 37 inside the board. The external connection port PM45 is a port to be connected to the ground potential or the external connection port PM46 via wiring provided on the external mount board. The sixth filter circuit 37 is configured with a matching inductance L9 and two surface acoustic wave filters SAW6 and SAW7.

The external connection port PM46 is a port to be connected to the external connection port PM45 or the external connection port PM47 via wiring provided on the external mount board, and is connected to the connection switch port PIC37 of the switching device SWIC via a transmission line.

The external connection port PM47 is a port to be connected to the external connection port PM46 via wiring provided on the external mount board or the ground potential, and is connected to the external connection ports PM48 to PM50 via the seventh filter circuit 38. The external connection ports PM48 to PM50 are unbalanced/balanced ports to be connected to the ground potential or a transmission-reception signal processing circuit of Band 8 class of WCDMA. The seventh filter circuit 38 is configured with a matching inductance L10 and two surface acoustic wave filters SAW8 and SAW9.

Connection modes of the foregoing external connection ports PM42 to PM50 are determined in response to a wiring structure on the external mount board on which the high frequency module 21 is mounted.

Specifically, when the high frequency module 21 is mounted on the external mount board of a cellular phone with the third specification that corresponds to the band 1 class and the Band 5 class of WCDMA, the external connection ports PM42 to PM44 are connected to the transmission-reception signal processing circuit of the Band 5 class of WCDMA. Further, the external connection port PM45 and the external connection port PM46 are connected to each other via wiring provided on the external mount board. The external connection ports PM47 to PM50 are connected to the ground potential. Note that this external mount board corresponds to a third mount board in the present preferred embodiment.

Providing such a wiring structure in an external circuit allows the high frequency module 21 to comply with the third specification or with the GSM (Registered trademark) standards, the standards of Band 1 class of WCDMA, and the standards of Band 5 class of WCDMA.

Further, when the high frequency module 21 is mounted on the external mount board of a cellular phone with the fourth specification that corresponds to the Band 1 class and the Band 8 class of WCDMA, the external connection ports PM42 to PM45 are connected to the ground potential. Further, the external connection port PM46 and the external connection port PM47 are connected to each other via wiring provided on the external mount board. The external connection ports PM48 to PM50 are connected to the transmission-reception signal processing circuit of the Band 8 class of WCDMA. Note that this external mount board corresponds to a fourth mount board in the present preferred embodiment.

Providing such a wiring structure in the external circuit allows the high frequency module 21 to comply with the fourth specification or with the GSM (Registered trademark) standards, the standards of Band 1 class of WCDMA, and the standards of Band 8 class of WCDMA.

Note that a detailed description regarding a mounting plane structure of the module board 22 is not provided here. However, arranging the external connection ports PM42 to PM 50 side-by-side in sequence on the mounting plane of the module board 22 facilitates determination of wiring structure or formation of wiring on the external mount board.

Third Preferred Embodiment

Next, a high frequency module according to the third preferred embodiment of the present invention is described.

The high frequency module according to the present preferred embodiment is capable of complying with a fifth specification and a sixth specification of cellular phone. The fifth specification of cellular phone is a specification focused on ESD protection from an antenna where the antenna is connected to a switching device via an ESD protection circuit. The sixth specification of cellular phone is a specification focused on an antenna gain where an antenna port is connected directly to the switching device without having the ESD protection circuit between them, thus preventing loss due to the ESD protection circuit from happening.

Figure 7:
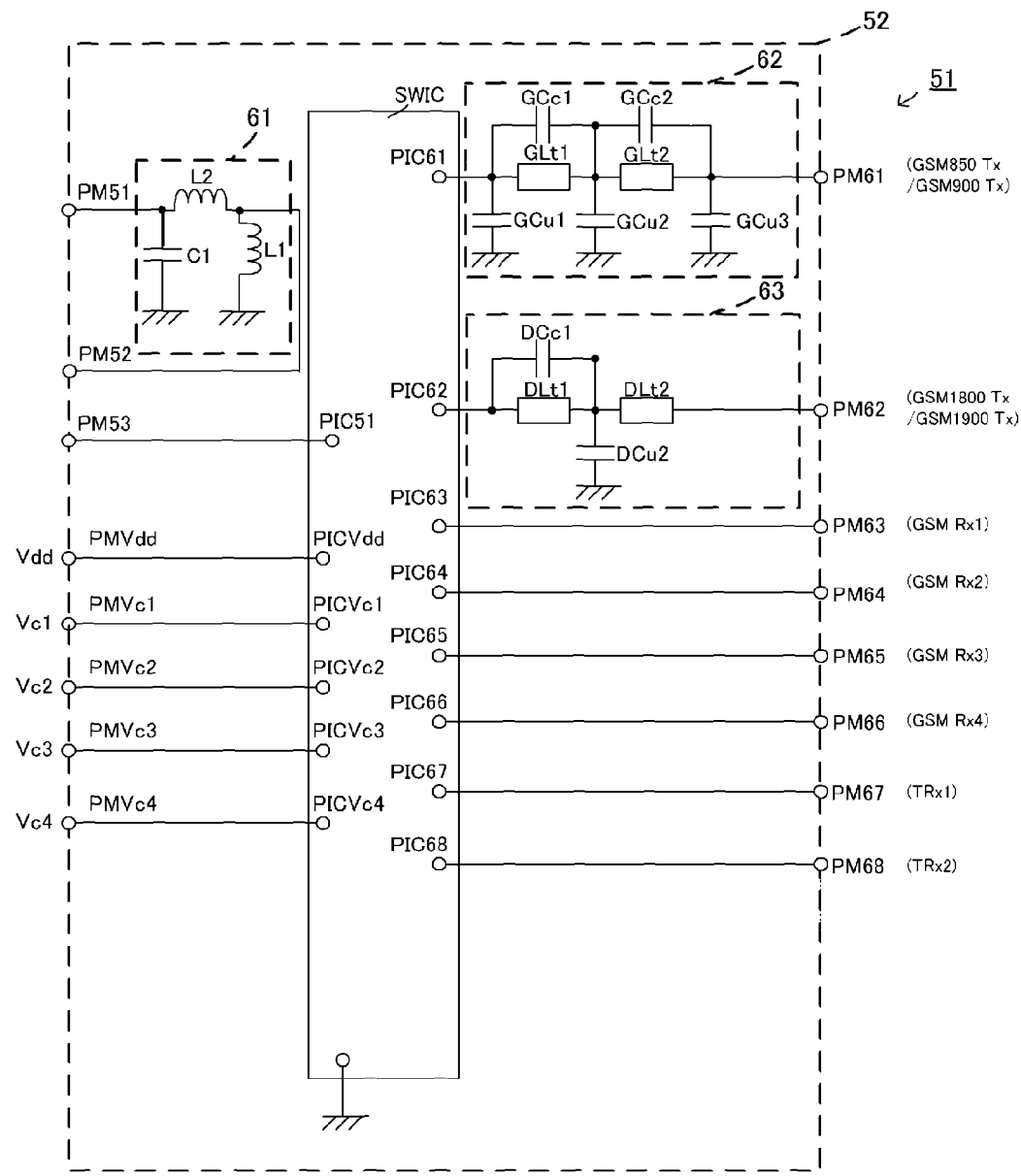
FIG. 7 is a diagram illustrating a configuration of a high frequency circuit module according to a third preferred embodiment of the present invention.

Now, a circuit configuration of a high frequency module 51 according to the third preferred embodiment is described. FIG. 7 is a block diagram illustrating the circuit configuration of the high frequency module 51. Note that detailed descriptions regarding constituting elements similar to those in the first preferred embodiment are omitted below.

The high frequency module 51 includes a module board 52 and a switching element SWIC.

The switching element SWIC includes a power port PICVdd, control ports PICVc1 to PICVc4, a common port PIC51, and connection switch ports PIC61 to PIC68.

The module board 52 includes, inside the board, an antenna matching circuit 61, a first filter circuit 62, and a second filter circuit 63, and a plurality of wiring electrodes. Further, on a board mounting plane, the module board 52 includes external connection ports PMVdd, PMVc1 to PMVc4, PM51 to PM53, and PM61 to PM68.

The external connection port PM51 is a port to be connected to an antenna port or a ground potential, and is connected to the external connection port PM52 via the antenna matching circuit 61 inside the board. The external connection port PM52 is a port to be connected to the ground potential or the external connection port PM53 via wiring provided on the external mount board. The external connection port PM53 is a port to be connected directly to the antenna port or the external connection port PM52 via wiring provided on the external mount board, and is connected to the common port PIC51 of the switching device SWIC via a transmission line inside the board.

Connection modes of these external connection ports PM51 to PM53 are determined in response to a wiring structure on the external mount board on which the high frequency module 51 is mounted.

Specifically, when the high frequency module 51 is mounted on the external mount board of a cellular phone with the fifth specification in which an antenna port is connected via an ESD protection circuit, the external connection port PM51 is connected to the antenna port. Further, the external connection port PM52 and the external connection port PM53 are connected to each other via wiring provided on the external mount board. Providing such a wiring structure in an external circuit allows the high frequency module 51 to comply with the fifth specification. Note that this external mount board corresponds to a fifth mount board in the present preferred embodiment.

Further, when the high frequency module 51 is mounted on the external mount board of a cellular phone with the sixth specification in which an antenna port is directly connected without involving an ESD protection circuit, the external connection port PM51 and the external connection port PM52 are connected to the ground potential. The external connection port PM53 is connected to the antenna port. Providing such a wiring structure in an external circuit allows the high frequency module 51 to comply with the sixth specification. Note that this external mount board corresponds to a sixth mount board in the present preferred embodiment.

Although the present invention may be implemented in the respective preferred embodiments described above, design changes may be suitably made in the specific configuration or the like of the high frequency module of the present invention. Functions and effects described in the foregoing preferred embodiments are merely most preferred functions and effects obtained from the present invention, and the functions and effects of the present invention are not limited to those described in the foregoing preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high frequency module comprising:
    a module board;
    a switching device mounted on the module board, wherein the switching device includes:
        a plurality of ports including a common port and a plurality of connection switch ports configured to perform switching between connection destinations of the common port; and
    the module board includes:
        a plurality of external connection ports;
        a plurality of device connection ports connected to ones of the plurality of external connection ports and on which ones of the plurality of ports of the switching device are mounted;
        a first circuit portion connected between one of the plurality of external connection ports and one of the plurality of device connection ports; and
        a second circuit portion connected between two of the plurality of external connection ports independently from the plurality of device connection ports; wherein
    in a state where the second circuit portion is not connected to the first circuit portion, signals flowing through the plurality of external connection ports correspond to a first communication specification; and
    in a state where the second circuit portion is connected to the first circuit portion, signals flowing through the plurality of external connection ports correspond to a second communication specification different from the first communication specification.

2. The high frequency module according to claim 1, wherein a number of the plurality of ports included in the switching device is less than a number of the external connection ports included in the module board.

3. The high frequency module according to claim 1, wherein
    an external connection port connected to the first circuit portion and an external connection port connected to the second circuit portion are arranged adjacent to each other on a same principle surface of the module board.

4. The high frequency module according to claim 1, wherein
    the first circuit portion is a transmission line connected to the connection switch port of the switching device; and
    the second circuit portion includes a filter circuit configured to filter a signal at a preset frequency band.

5. A high frequency component comprising:
    the high frequency module according to claim 4; and
    a mount board on which the high frequency module is mounted; wherein
    the mount board includes:
        an antenna port connected to the common port of the switching device via the external connection port of the module board;
        a filter circuit connected to the first circuit portion of the module board via the external connection port; and
        a ground electrode configured to set potentials of two external connection ports connected to the second circuit portion of the module board to a ground potential.

6. The high frequency component according to claim 5, wherein a number of the plurality of ports included in the switching device is less than a number of the external connection ports included in the module board.

7. The high frequency component according to claim 5, wherein an external connection port connected to the first circuit portion and an external connection port connected to the second circuit portion are arranged adjacent to each other on a same principle surface of the module board.

8. A high frequency component comprising:
    the high frequency module according to claim 4; and
    a mount board on which the high frequency module is mounted; wherein
    the mount board includes:
        an antenna port connected to the common port of the switching device via the external connection port of the module board;
        a transmission line connected between the first circuit portion and the second circuit portion of the module board via the external connection ports; and
        a filter circuit connected to the second circuit portion of the module board via the external connection port.

9. The high frequency component according to claim 8, wherein a number of the plurality of ports included in the switching device is less than a number of the external connection ports included in the module board.

10. The high frequency component according to claim 8, wherein an external connection port connected to the first circuit portion and an external connection port connected to the second circuit portion are arranged adjacent to each other on a same principle surface of the module board.

11. The high frequency module according to claim 1, wherein
the first circuit portion is a transmission line that is connected to the common port of the switching device; and
the second circuit portion includes an electro-static discharge protection circuit configured to allow an excess current to overflow to ground.

12. The high frequency component according to claim 11, wherein a number of the plurality of ports included in the switching device is less than a number of the external connection ports included in the module board.

13. The high frequency component according to claim 11, wherein an external connection port connected to the first circuit portion and an external connection port connected to the second circuit portion are arranged adjacent to each other on a same principle surface of the module board.

14. A high frequency component comprising:
the high frequency module according to claim 11; and
a mount board on which the high frequency module is mounted, wherein
the mount board includes:
a filter circuit connected to the connection switch port of the switching device via the external connection port of the module board;
an antenna port connected to the first circuit portion of the module board via the external connection port; and
a ground electrode configured to set potentials of two external connection ports connected to the second circuit portion of the module board to a ground potential.

15. The high frequency component according to claim 14, wherein a number of the plurality of ports included in the switching device is less than a number of the external connection ports included in the module board.

16. The high frequency component according to claim 14, wherein an external connection port connected to the first circuit portion and an external connection port connected to the second circuit portion are arranged adjacent to each other on a same principle surface of the module board.

17. A high frequency component comprising:
the high frequency module according to claim 11; and
a mount board on which the high frequency module is mounted; wherein
the module board includes:
a filter circuit connected to the connection switch port of the switching device via the external connection port of the module board;
a transmission line connected between the first circuit portion and the second circuit portion of the module board via the external connection ports; and
an antenna port connected to the second circuit portion of the module board via the external connection port.

18. The high frequency component according to claim 17, wherein a number of the plurality of ports included in the switching device is less than a number of the external connection ports included in the module board.

19. The high frequency component according to claim 17, wherein an external connection port connected to the first circuit portion and an external connection port connected to the second circuit portion are arranged adjacent to each other on a same principle surface of the module board.

* * * * *